United States Patent
Umeyama et al.

(10) Patent No.: US 10,263,239 B2
(45) Date of Patent: Apr. 16, 2019

(54) METHOD FOR MANUFACTURING ELECTRODE SHEET

(71) Applicant: TOYOTA JIDOSHA KABUSHIKI KAISHA, Toyota-shi, Aichi-ken (JP)

(72) Inventors: Hiroya Umeyama, Okazaki (JP); Naoyuki Wada, Hirakata (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/180,286

(22) Filed: Jun. 13, 2016

(65) Prior Publication Data

US 2017/0018777 A1   Jan. 19, 2017

(30) Foreign Application Priority Data

Jul. 13, 2015   (JP) .................................. 2015-139531

(51) Int. Cl.
   *B05D 5/12*   (2006.01)
   *H01M 4/04*   (2006.01)
   *H01M 4/62*   (2006.01)

(52) U.S. Cl.
   CPC ........... *H01M 4/0404* (2013.01); *H01M 4/62* (2013.01)

(58) Field of Classification Search
   CPC combination set(s) only.
   See application file for complete search history.

(56) References Cited

U.S. PATENT DOCUMENTS

| | | | | |
|---|---|---|---|---|
| 2005/0058907 | A1* | 3/2005 | Kurihara | H01M 4/0404 429/232 |
| 2009/0325075 | A1* | 12/2009 | Tsuchiya | H01G 11/38 429/232 |
| 2013/0184194 | A1* | 7/2013 | Chen | C11D 3/225 510/321 |
| 2014/0342225 | A1 | 11/2014 | Isshiki et al. | |
| 2017/0012290 | A1* | 1/2017 | Watanabe | H01M 4/134 |
| 2017/0137619 | A1* | 5/2017 | Thompson | C08L 23/22 |

FOREIGN PATENT DOCUMENTS

| | | |
|---|---|---|
| CN | 103907226 A | 7/2014 |
| JP | 10-55801 * | 2/1998 |
| JP | 10-55801 A | 2/1998 |
| JP | 2010-108716 A | 5/2010 |
| JP | 2013-77560 * | 4/2013 |
| JP | 2013-77560 A | 4/2013 |
| JP | 2014-203771 A | 10/2014 |

OTHER PUBLICATIONS

Ambjornsson et al. "Carboxymethyl cellulose produced at different mercerization conditions by NIR FT Raman spectroscopy in combination with multivariate analytical methods" (2013).*

* cited by examiner

*Primary Examiner* — Austin Murata (74) *Attorney, Agent, or Firm* — Sughrue Mion, PLLC (57) ABSTRACT

A method for manufacturing an electrode sheet includes the steps of forming a granulated material by mixing an electrode active material, a cellulose derivative, a binder, and an aqueous solvent, and placing the granulated material in the form of a sheet on electrode current collector foil. The cellulose derivative is at least one selected from the group consisting of hydroxyethyl cellulose, hydroxypropyl cellulose, hydroxyethyl methylcellulose, and hydroxypropyl methylcellulose, and has 3.0 or more moles of substitution, which is an average number of hydroxy groups substituted per glucose unit.

8 Claims, 9 Drawing Sheets

METHOD FOR MANUFACTURING ELECTRODE SHEET

This nonprovisional application is based on Japanese Patent Application No. 2015-139531 filed on Jul. 13, 2015 with the Japan Patent Office, the entire contents of which are hereby incorporated by reference.

BACKGROUND OF THE INVENTION

Field of the Invention

The present invention relates to a method for manufacturing an electrode sheet.

Description of the Background Art

Japanese Patent Laying-Open No. 10-55801 discloses a method for forming a granulated material using an aqueous solvent.

SUMMARY OF THE INVENTION

Conventionally, in order to manufacture electrode sheets for nonaqueous electrolyte secondary batteries, a method is commonly used wherein a coating for forming an electrode mixture layer is prepared, and this coating is applied onto electrode current collector foil and dried (hereinafter also referred to as the "coating method").

The coating is a colloidal dispersion obtained by dispersing an electrode active material, a binder, and the like in a solvent. With the coating method, the binder tends to be unevenly distributed in a thickness direction of the electrode mixture layer. This is because during drying of the coating, convection occurs in the solvent, which causes the binder to migrate to a surface layer of the coating film. This phenomenon is also referred to as binder migration. When the binder migration occurs, the amount of the binder becomes insufficient at the interface between the electrode current collector foil and the electrode mixture layer, which reduces the peel strength of the electrode mixture layer. Moreover, a binder has poor ion conductivity, and inhibits the migration of ions (typically, lithium ions) that carry electricity. This leads to a decrease in ion acceptability in the electrode mixture layer where the binder is unevenly distributed over the surface layer as a result of the binder migration.

Japanese Patent Laying-Open No. 10-55801 discloses a granulated material as an electrode precursor different from that in the coating method. The granulated material is a mass of granules (composite granules) containing an electrode active material, a binder, and the like. The granulated material is formed into a sheet-like electrode mixture layer by roll molding, for example. This manufacturing method will also be referred to as the "granulated material molding method", hereinafter.

The granulated material molding method can significantly improve the uneven distribution of the binder. This is because the amount of a solvent, which is a fundamental cause of the binder migration, is small. Improvements in peel strength and ion acceptability can therefore be expected with the granulated material molding method. The granulated material molding method, however, which uses an aqueous solvent, has not demonstrated an effect as high as expected.

Accordingly, the present invention aims to provide an electrode sheet having improved peel strength and ion acceptability, while using an aqueous solvent.

[1] A method for manufacturing an electrode sheet includes the steps of forming a granulated material by mixing an electrode active material, a cellulose derivative, a binder, and an aqueous solvent, and placing the granulated material in the form of a sheet on electrode current collector foil. The cellulose derivative is at least one selected from the group consisting of hydroxyethyl cellulose, hydroxypropyl cellulose, hydroxyethyl methylcellulose, and hydroxypropyl methylcellulose, and has 3.0 or more moles of substitution, which is an average number of hydroxy groups substituted per glucose unit.

According to the above-described method, an electrode sheet having improved peel strength and ion acceptability is provided. A reason therefor is believed to be as follows.

Generally, in the preparation of a coating using an aqueous solvent, carboxymethylcellulose (CMC) is used as a dispersion stabilizer to maintain a dispersion state of the electrode active material and the like. In the coating, CMC is dispersed or dissolved in a large amount of the solvent.

Similarly, in the preparation of the granulated material using an aqueous solvent, CMC is commonly used as in the coating. CMC in the granulated material, however, plays a different role from the role (dispersion stabilizer) in the coating. In the granulated material, CMC serves as a granulation promoting agent.

During the formation of the granulated material, CMC is present as a powder in a swollen state. This is because the amount of the solvent is smaller than that in the coating. CMC exhibits a binding effect, and promotes binding of particles of the electrode active material. At the same time, however, CMC particles also tend to agglomerate, and thus, CMC cannot be readily dispersed evenly throughout the granulated material.

Figure 1:
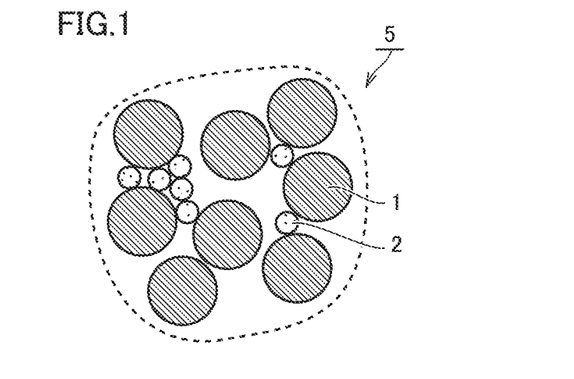
FIG. 1 is a schematic conceptual diagram showing one exemplary granule constituting a granulated material.

FIG. 1 is a schematic conceptual diagram showing one exemplary granule constituting a granulated material. A granule 5 contains a plurality of particles of an electrode active material 1, and cellulose derivative 2. In FIG. 1, cellulose derivative 2 is CMC. As shown in FIG. 1, CMC has low dispersibility and tends to agglomerate, and thus, is unevenly distributed within granule 5. This is believed to cause a nonuniform electrode reaction, which reduces ion acceptability.

One possible means for improving the dispersibility of CMC may be to increase the amount of the aqueous solvent. Increasing the amount of the aqueous solvent, however, will cause the granulated material to agglomerate, which makes it difficult to manufacture an electrode sheet using the granulated material forming method. Moreover, further increasing the amount of the aqueous solvent will cause the mixture to be turned into a coating. For the same purpose as described above, another possible means may be to increase the proportion of CMC added. CMC, however, is one of resistance components, and thus, increasing the proportion of CMC added will promote a decrease in ion acceptability.

In the manufacturing method according to [1] above, therefore, the specific cellulose derivative different from CMC is used. That is, the cellulose derivative, which is at least one selected from the group consisting of hydroxyethyl cellulose (HEC), hydroxypropyl cellulose (HPC), hydroxyethyl methylcellulose (HEMC), and hydroxypropyl methylcellulose (HPMC), and has 3.0 or more moles of substitution, is used.

Figure 2:
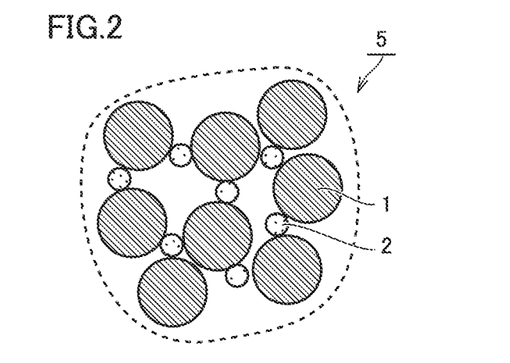
FIG. 2 is a schematic conceptual diagram showing another exemplary granule constituting a granulated material.

The mole(s) of substitution represents the number of hydrophilic groups in the cellulose derivative, i.e., an index of hydrophilicity and water-solubility of the cellulose derivative. CMC has at most about 0.6 to 1.5 moles of substitution. In contrast, the cellulose derivative (which may be referred to as "HEC or the like", hereinafter) in the manufacturing method according to [1] above has 3.0 or more moles of substitution. HEC or the like exhibits water-solubility, because of its high moles of substitution. Thus, when the electrode active material, HEC or the like, the binder, and the aqueous solvent are mixed, HEC or the like is dissolved in the aqueous solvent and dispersed throughout the mixture. FIG. 2 is a schematic conceptual diagram showing another exemplary granule constituting a granulated material. In FIG. 2, cellulose derivative 2 is HEC or the like. With the manufacturing method according to [1] above, as shown in FIG. 2, granule 5, and hence, a granulated material, in which cellulose derivative 2 is evenly dispersed, can be formed. With the manufacturing method according to [1] above, therefore, by utilizing the advantage of the granulated material molding method that the amount of solvent is small, improvement in peel strength, as well as improvement in ion acceptability attributed to the improved dispersion state of the cellulose derivative, can be achieved.

[2] In the manufacturing method according to [1] above, preferably, solids of the granulated material contain not less than 0.1 mass % and not more than 3.0 mass % of the cellulose derivative. Within this range, improvements in peel strength and ion acceptability can be expected. As used herein, the term "solids" represents components other than the aqueous solvent (nonvolatile components) of the components of the granulated material.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

One exemplary embodiment of the present invention (hereinafter also referred to as the "present embodiment") will be described below by way of example. The present embodiment, however, is not limited thereto. As used herein, the term "electrode" collectively refers to a "negative electrode" and a "positive electrode". That is, the term "electrode sheet" represents at least one of a "negative electrode sheet" and a "positive electrode sheet". The term "electrode mixture layer" represents at least one of a "negative electrode mixture layer" and a "positive electrode mixture layer". The term "electrode active material" represents at least one of a "negative electrode active material" and a "positive electrode active material". The term "electrode current collector foil" represents at least one of "negative electrode current collector foil" and "positive electrode current collector foil".

[Method for Manufacturing Electrode Sheet]

Figure 3:
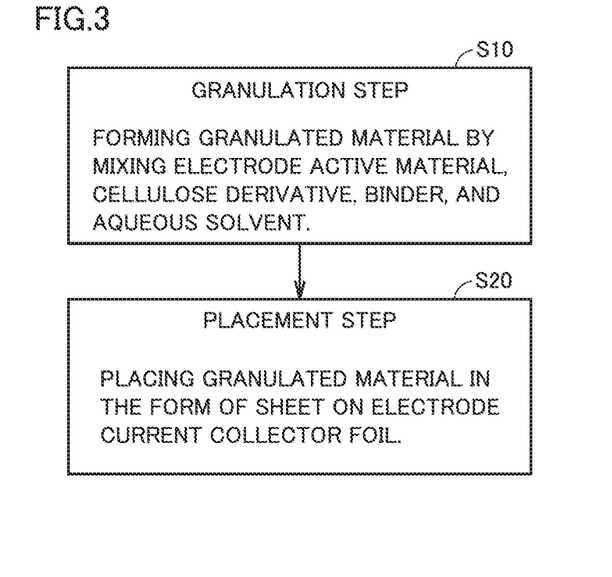
FIG. 3 is a flowchart showing an outline of a method for manufacturing an electrode sheet according to one embodiment of the present invention.

FIG. 3 is a flowchart showing an outline of a method for manufacturing an electrode sheet according to the present embodiment. As shown in FIG. 3, the manufacturing method includes a granulation step (S10) and a placement step (S20). Each of these steps will be described below.

[Granulation Step (S10)]

In the granulation step (S10), a granulated material is formed by mixing an electrode active material, a cellulose derivative, a binder, and an aqueous solvent. In this step, any of various granulation operations may be performed, for example, agitation granulation, fluidized bed granulation, and tumbling granulation. In the case of agitation granulation, a granulator such as, for example, "High Speed Mixers" or "High Flex Gral" from Earth Technica Co., Ltd., may be used. Alternatively, a mixer such as a planetary mixer or the like may be used. In a specific granulation operation, the electrode active material, the cellulose derivative, the binder, and the aqueous solvent may be introduced into the agitation vessel of the granulator, and mixed with agitation. The rotation speed of the agitator blades, the agitation time, and the like may be changed as appropriate, in accordance with the powder properties and the like of each of the materials. These components may be introduced into the agitation vessel together at once, or each of the components may be introduced in a stepwise manner.

[Aqueous Solvent]

In the present embodiment, the term "aqueous solvent" represents water, or a mixed solvent of water and a polar organic solvent. In view of handleability, water is the most preferable. Examples of the polar organic solvent usable as the mixed solvent may include alcohols such as methanol, ethanol, and isopropyl alcohol; ketones such as acetone; and ethers such as tetrahydrofuran. The amount of the aqueous solvent used may be adjusted such that the solids concentration in the granulated material is about 60 to 80 mass %, for example. Within this range, improvements in the prevention of the binder migration and the dispersibility of the cellulose derivative can be expected. As used herein, the term "solids concentration" represents the mass ratio of components other than the solvent (nonvolatile components) in the mixture (granulated material, the coating, or the like).

[Electrode Active Material]

The electrode active material may be a negative electrode active material or a positive electrode active material. The negative electrode active material may, for example, be a carbon-based negative electrode active material such as graphite, graphitizable carbon, non-graphitizable carbon, or the like, or may be an alloy-based negative electrode active material containing silicon (Si), tin (Sn), and the like. The negative electrode active material may have a mean particle size of about 5 to 25 μm, for example. As used herein, the term "mean particle size" represents the particle size at a cumulative value of 50% (also referred to as "d50" or a "median size") in the particle size distribution on a volume basis measured using the laser diffraction/scattering method.

The positive electrode active material may be a lithium (Li)-containing metal oxide, for example. Examples of the Li-containing metal oxide may include $LiCoO_2$, $LiNiO_2$, a compound represented by the general formula: $LiNi_aCo_bO_2$ (where $a+b=1$, $0<a<1$, and $0<b<1$), $LiMnO_2$, $LiMn_2O_4$, a compound represented by the general formula: LiNi$_a$Co$_b$Mn$_c$O$_2$ (where a+b+c=1, 0<a<1, 0<b<1, and 0<c<1), and LiFePO$_4$. The compound represented by the general formula: LiNi$_a$Co$_b$Mn$_c$O$_2$ may be LiNi$_{1/3}$Co$_{1/3}$Mn$_{1/3}$O$_2$, for example. The positive electrode active material may have a mean particle size of about 5 to 25 μm, for example.

[Cellulose Derivative]

The cellulose derivative is a polymer compound in which some or all of the hydroxy groups of the cellulose have been hydroxyalkyl-etherified. The cellulose derivative is produced by immersing pulp in a sodium hydroxide solution to form alkali cellulose, and reacting the alkali cellulose with an alkylene oxide (such as, for example, ethylene oxide or propylene oxide). The cellulose derivative can be represented by the following formula (I):

(I)

where n represents the average degree of polymerization of the cellulose chain, and each R represents a substituent such as a hydrogen atom (—H) or a hydroxyalkyl group, for example.

The cellulose derivative in the present embodiment is at least one selected from the group consisting of HEC, HPC, HEMC, and HPMC.

HEC refers to a polymer compound in accordance with formula (I) above, where each R is a hydrogen atom or a substituent represented by the following formula (II):

(II)

where m is an integer from 1 or more.

HPC refers to a polymer compound in accordance with formula (I) above, where each R is a hydrogen atom or a substituent represented by the following formula (III):

(III)

where m is an integer from 1 or more.

HEMC refers to a polymer compound in accordance with formula (I) above, where each R is a hydrogen atom, a methyl group (—CH$_3$), or a substituent represented by formula (II) above.

HPMC refers to a polymer compound in accordance with formula (I) above, where each R is a hydrogen atom, a methyl group, or a substituent represented by formula (III) above.

HEC, HPC, HEMC, and HPMC may be used singly or in a combination of two or more. An effect expected in the present embodiment is demonstrated so long as at least one of the above is used.

Note that CMC refers to a polymer compound in accordance with formula (I) above, where each R is a hydrogen atom or a carboxymethyl group (—CH$_2$—COOH).

The cellulose derivative according to the present embodiment has 3.0 or more moles of substitution. The term "mole of substitution" or "moles of substitution" represents the average number of hydroxy groups substituted per glucose unit. Although the number of Rs per glucose unit is three in formula (I) above, the etherification of the cellulose also causes the hydroxy groups contained in the substituent to be etherified, as shown in formulae (II) and (III) above, for example; therefore, the number of moles of substitution can exceed 3. That is, the term "mole of substitution" or "moles of substitution" represents the average number of moles of the alkylene oxide added per glucose unit. While the upper limit of the moles of substitution is not particularly limited, it is 6.0, for example. The upper limit of the moles of substitution is preferably 5.0. The lower limit of the moles of substitution is preferably 4.0.

Generally, CMC for coatings has a weight average molecular weight of about 1,000,000. In the present embodiment, on the other hand, the cellulose derivative preferably has a weight average molecular weight not less than 500,000 and not more than 1,000,000. The weight average molecular weight of the cellulose derivative can be measured using gel permeation chromatography.

[Binder]

A binder having good dispersibility in the aqueous solvent is desirable as the binder. For example, polyacrylic acid (PAA), styrene butadiene rubber (SBR), acrylonitrile-butadiene rubber (NBR), and polytetrafluoroethylene (PTFE) can be used as the binder. These binders may be used singly or in a combination of two or more.

[Other Components]

In the granulation step (S10), the above-described components may be mixed with a conductive material and the like, so that the granulated material contains the conductive material and the like. Examples of the conductive material may include carbon blacks such as acetylene black and thermal black.

[Proportions of Solids Contained in Granulated Material]

The proportions of solids contained in the granulated material (that is, the composition of the electrode mixture layer) are, for example, as follows.

Cellulose derivative: about 0.1 to 3.0 mass %
Binder: about 0.5 to 1.5 mass %
Conductive material: about 0 to 10 mass %
Electrode active material: about 85.5 to 99.4 mass %.

When the granulated material contains not less than 0.1 mass % and not more than 3.0 mass % of the cellulose derivative, improvements in peel strength and ion acceptability of the electrode sheet can be expected. The proportion of the cellulose derivative contained may also be not less than 0.1 mass % and not more than 1.0 mass %. In this case, particularly, improvement in ion acceptability can be expected. The proportion of the cellulose derivative contained may also be not less than 1.0 mass % and not more than 3.0 mass %. In this case, particularly, improvement in peel strength can be expected.

[Placement Step (S20)]

Figure 4:
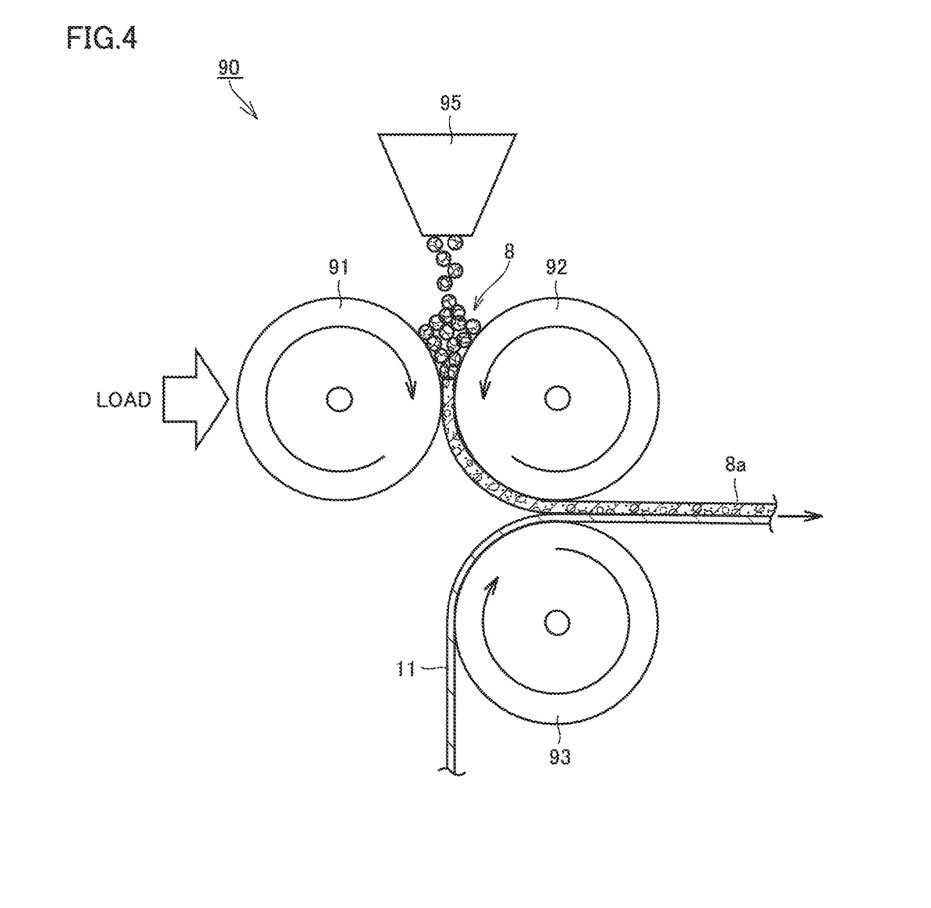
FIG. 4 is a schematic conceptual diagram illustrating the placement step.

In the placement step (S20), the granulated material is placed in the form of a sheet on the electrode current collector foil. The granulated material thus forms the electrode mixture layer. FIG. 4 is a schematic conceptual diagram illustrating the placement step (S20). With reference to FIG. 4, the placement step will be described below.

An electrode manufacturing apparatus 90 shown in FIG. 4 includes a feeder 95 and three rolls (roll A 91, roll B 92, and roll C 93). The curved arrow drawn within each of the rolls indicates the direction of rotation of the roll. The granulated material is fed into feeder 95. Feeder 95 feeds granulated material 8 between roll A 91 and roll B 92. Granulated material 8 is conveyed along roll A 91 or roll B 92 to be fed through a gap between roll A 91 and roll B 92. A predetermined load is applied to roll A 91. The granulated material is compacted in the gap between roll A 91 and roll B 92 to be molded into a sheet. The coating weight (mass per unit area) of the sheet-like granulated material can be adjusted with the gap.

Next, a sheet-like granulated material 8a is placed on the electrode current collector foil. When the electrode sheet is a negative electrode sheet, the electrode current collector foil is copper (Cu) foil, for example. When the electrode sheet is a positive electrode sheet, the electrode current collector foil is aluminum (Al) foil, for example. The electrode current collector foil may have a thickness of about 5 to 25 µm, for example.

As shown in FIG. 4, electrode current collector foil 11 is conveyed along roll C 93 to be fed through the gap between roll B 92 and roll C 93. After passing through the gap between roll A 91 and roll B 92, granulated material 8a is conveyed along roll B 92 to be fed through the gap between roll B 92 and roll C 93.

Granulated material 8a is pressed against electrode current collector foil 11 in the gap between roll B 92 and roll C 93, and then conveyed away from roll B 92 to be compression bonded to electrode current collector foil 11. In this way, the granulated material is placed in the form of a sheet on a predetermined position of the electrode current collector foil.

After granulated material 8a has been placed on electrode current collector foil 11, a drying step may be performed to volatilize the solvent remaining in the granulated material. The drying step may be performed in a hot-air drying oven (not shown) provided on a path line after roll C 93, for example.

The electrode current collector foil having the granulated material placed on one surface thereof may be fed onto roll C 93 again, to thereby allow the granulated material to be placed on both surfaces of the electrode current collector foil.

The granulated material placed on the electrode current collector foil forms the electrode mixture layer. A compression step may subsequently be performed to adjust the thickness and the density of the electrode mixture layer. The compression step may be performed using a rolling mill, for example. The electrode mixture layer may have a thickness of about 10 to 150 µm, for example.

Figure 5:
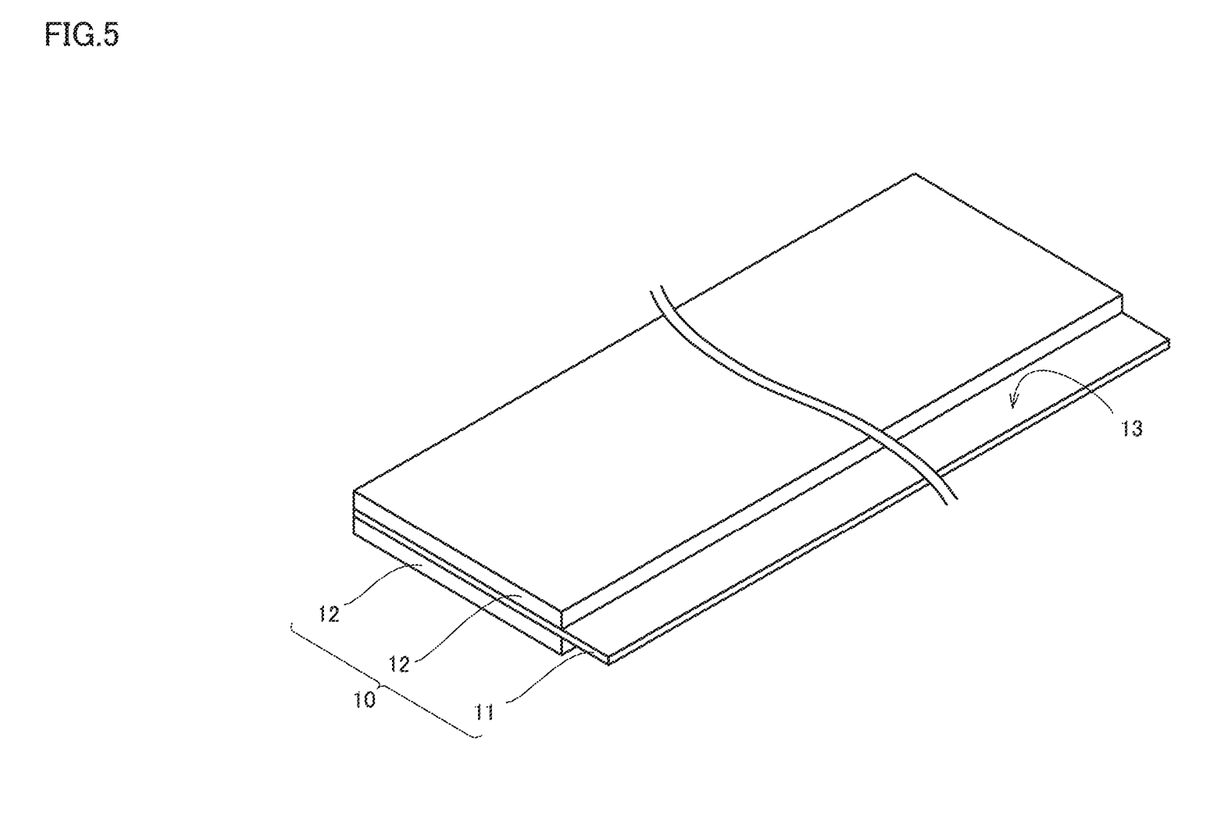
FIG. 5 is a schematic diagram showing one exemplary electrode sheet.

Lastly, the resulting material is cut into a predetermined size, using a slitter, for example, to thereby complete an electrode sheet 10 shown in FIG. 5. In FIG. 5, the granulated material forms electrode mixture layer 12.

[Method for Manufacturing Nonaqueous Electrolyte Secondary Battery]

Next, a method for manufacturing a nonaqueous electrolyte secondary battery, including the method for manufacturing the electrode sheet according to the present embodiment, will be described. The method for manufacturing a nonaqueous electrolyte secondary battery includes the steps of forming a granulated material by mixing an electrode active material, a cellulose derivative, a binder, and an aqueous solvent; and placing the granulated material in the form of a sheet on electrode current collector foil, wherein the cellulose derivative is at least one selected from the group consisting of HEC, HPC, HEMC, and HPMC, and has 3.0 or more moles of substitution, which is an average number of hydroxy groups substituted per glucose unit.

The term "nonaqueous electrolyte secondary battery" may simply be referred to as a "battery", hereinafter. An example where the present embodiment is applied to a prismatic battery will be described hereinafter by way of example. The present embodiment, however, is not limited to a prismatic battery, and is also applicable to a cylindrical battery, a laminate-type battery, and the like.

Figure 7:
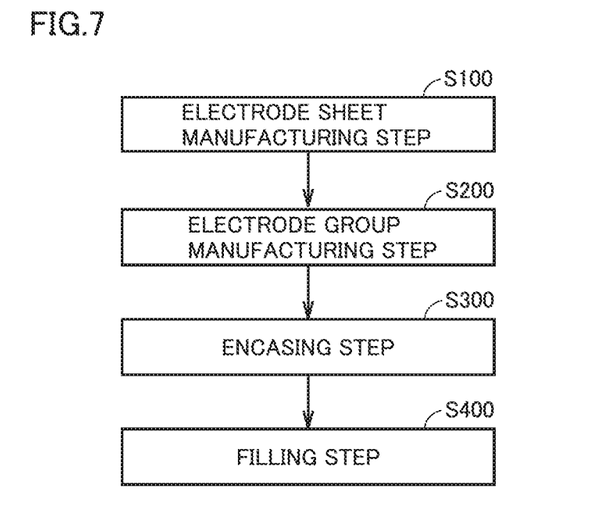
FIG. 7 is a flowchart showing an outline of a method for manufacturing a nonaqueous electrolyte secondary battery.

FIG. 7 is a flowchart showing an outline of the method for manufacturing a nonaqueous electrolyte secondary battery. The method for manufacturing a nonaqueous electrolyte secondary battery includes an electrode sheet manufacturing step (S100), an electrode group manufacturing step (S200), an encasing step (S300), and a filling step (S400). Each of these steps will be described below.

[Electrode Sheet Manufacturing Step (S100)]

Figure 6:
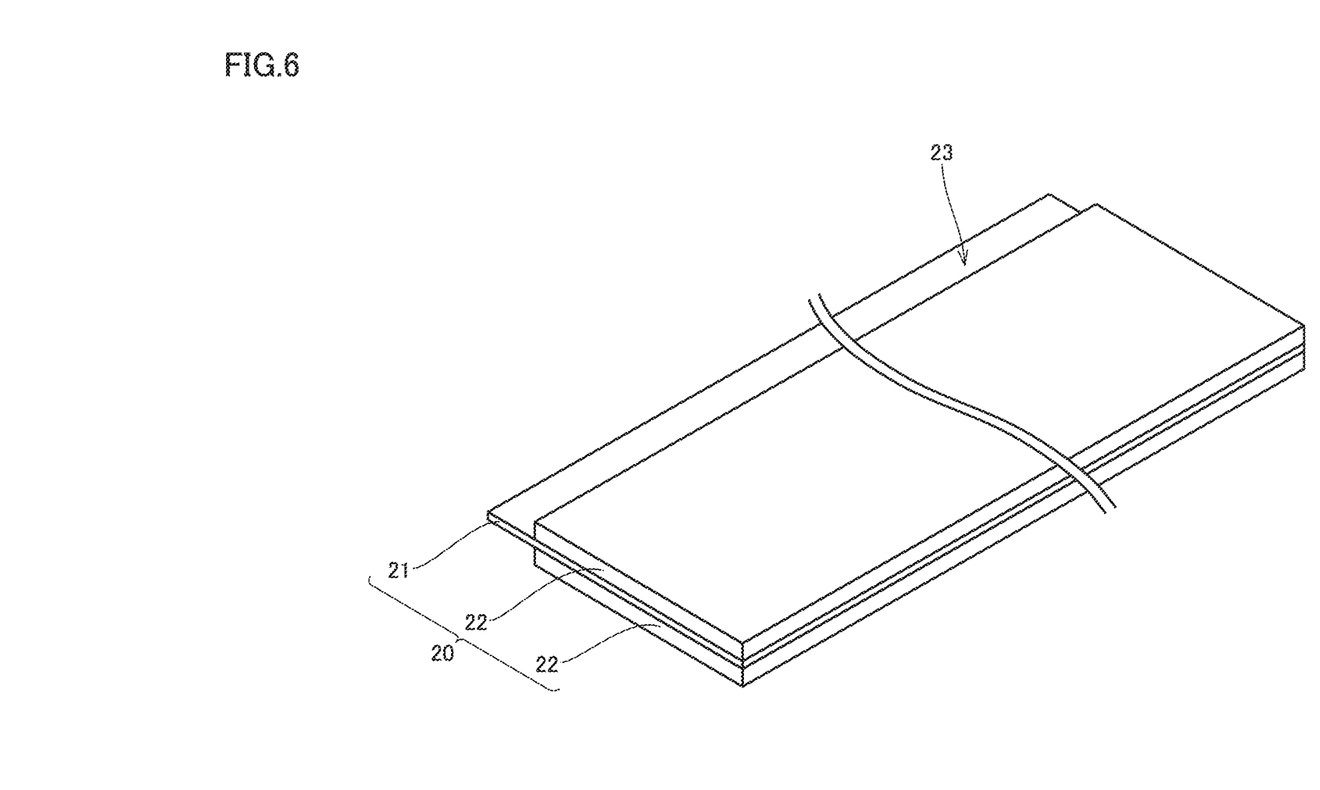
FIG. 6 is a schematic diagram showing another exemplary electrode sheet.

In the electrode sheet manufacturing step (S100), at least one of a negative electrode sheet and a positive electrode sheet is manufactured in accordance with the method for manufacturing the electrode sheet described above. The electrode sheet has the structure shown in FIG. 5 or 6, for example. Electrode sheet 10, 20 is in the form of a long strip. In electrode sheet 10, 20, an exposed portion 13, 23 of electrode current collector foil 11, 21 exposed from electrode mixture layer 12, 22 is provided for connection with an external terminal 70, 72 (see FIG. 9).

[Electrode Group Manufacturing Step (S200)]

Figure 8:
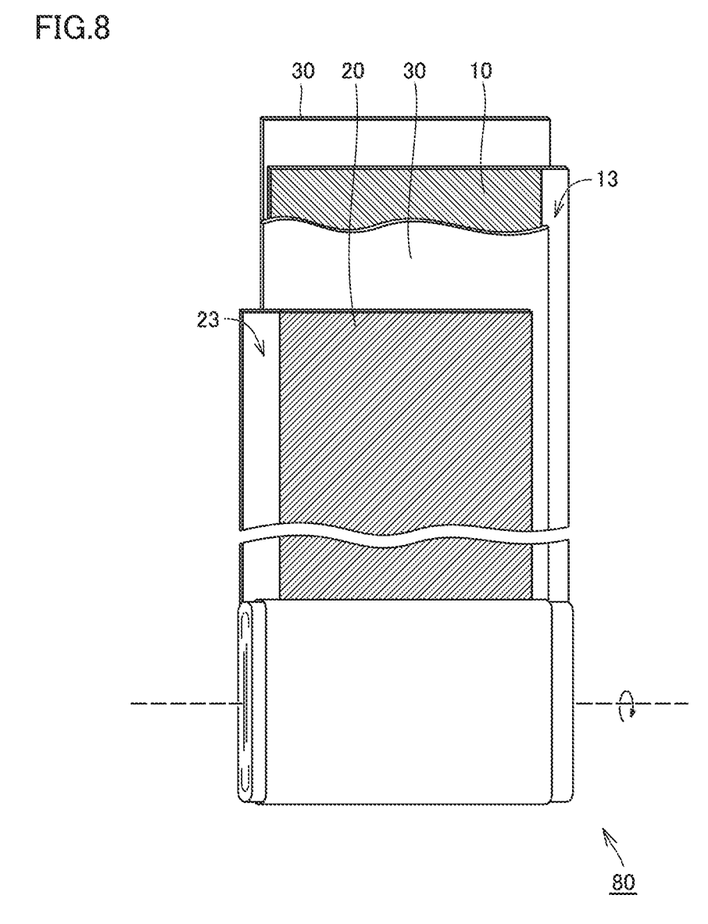
FIG. 8 is a schematic diagram showing one exemplary structure of an electrode group.

In the electrode group manufacturing step (S200), an electrode group is manufactured. FIG. 8 is a schematic diagram illustrating the structure of the electrode group. As shown in FIG. 8, an electrode group 80 is manufactured by stacking layers of a negative electrode sheet 10 and a positive electrode sheet 20 with a separator 30 therebetween, and then winding these stacked layers. After being wound, electrode group 80 may be molded to have a flat external shape, using a flat press machine, for example.

The separator may, for example, be a microporous film made of a polyolefin material such as polyethylene (PE) or polypropylene (PP), for example. The separator may have a thickness of about 5 to 30 µm, for example. The separator may be formed of a single layer or a plurality of layers. For example, the separator may have a three-layer structure in which layers of a microporous film of PE and a microporous film of PP are stacked in the order of PP/PE/PP. Alternatively, the separator may include a base material made of a microporous film such as PE or the like and a heat-resistant layer formed on the base material. The heat-resistant layer is formed of an inorganic filler such as alumina, or a heat-resistant resin such as aramid, for example.

[Encasing Step (S300)]

Figure 9:
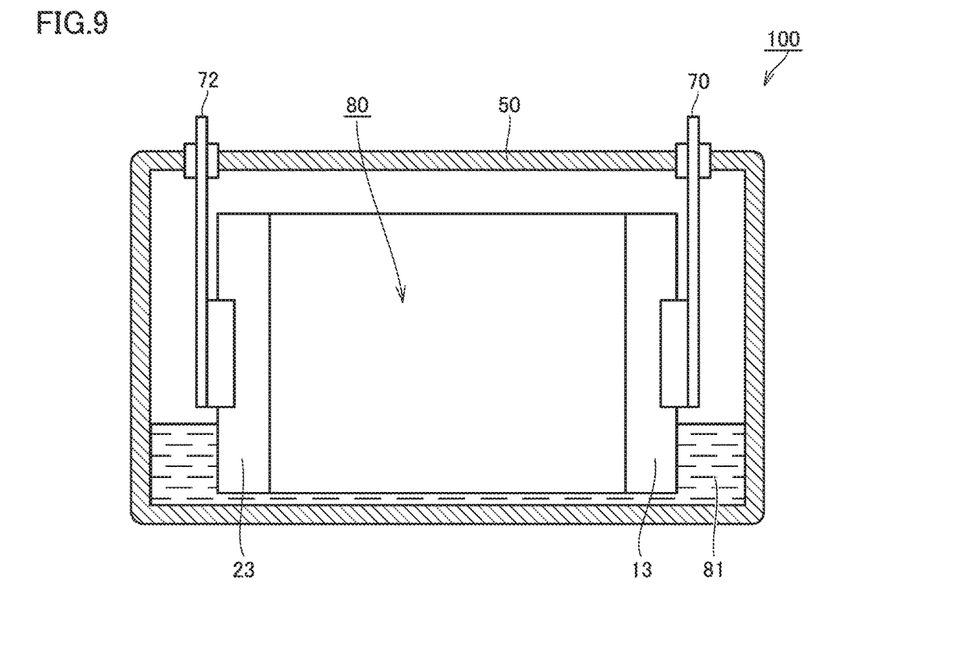
FIG. 9 is a schematic cross-sectional view showing one exemplary structure of the nonaqueous electrolyte secondary battery.

In the encasing step (S300), the electrode group is encased in a battery case. FIG. 9 is a schematic cross-sectional view showing one exemplary structure of the nonaqueous electrolyte secondary battery. The material of battery case 50 may be an Al alloy, for example. Battery case 50 may include a case main body and a lid. Battery case 50 may be provided with a safety valve, a filling hole, a current interrupt device, and the like. Electrode group 80 is connected to external terminals 70, 72 at exposed portions 13, 23.

[Filling Step (S400)]

In the filling step (S400), battery case 50 is filled with an electrolytic solution 81. Battery case 50 is filled with electrolytic solution 81 through a filling hole (not shown) provided in battery case 50, for example. After being filled, battery case 50 is sealed using a predetermined sealing means. As a result, a nonaqueous electrolyte secondary battery 100 is completed.

The electrolytic solution is a liquid electrolyte in which a supporting electrolyte is dissolved in an aprotic solvent. Examples of the aprotic solvent may include cyclic carbonates such as ethylene carbonate (EC), propylene carbonate (PC), butylene carbonate (BC), and γ-butyrolactone (GBL);

and chain carbonates such as dimethyl carbonate (DMC), ethyl methyl carbonate (EMC), and diethyl carbonate (DEC). The aprotic solvent may be a mixed solvent containing a cyclic carbonate and a chain carbonate. The volume ratio of the cyclic carbonate to the chain carbonate in the mixed solvent may be about 1:9 to 5:5, for example.

Examples of the supporting electrolyte may include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis(trifluoromethanesulfonyl)imide [$Li(CF_3SO_2)_2N$], lithium bis(fluorosulfonyl)imide [$Li(FSO_2)_2N$], and lithium trifluoromethanesulfonate ($LiCF_3SO_3$). Two or more of these supporting electrolytes may be used in combination. The concentration of the supporting electrolyte in the electrolytic solution is about 0.5 to 2.0 mol/L, for example.

The electrolytic solution may contain additives with various functions. The electrolytic solution may contain an additive for promoting or preventing the formation of SEI (Solid Electrolyte Interface), for example. Examples of the additive may include lithium bis(oxalato)borate [$LiB(C_2O_4)_2$; abbreviated as "LiBOB"], lithium difluoro(oxalato)borate [$LiBF_2(C_2O_4)$], lithium difluorobis(oxalato)phosphate [$LiPF_2(C_2O_4)_2$], lithium difluorophosphate ($LiPO_2F_2$), vinylene carbonate (VC), vinyl ethylene carbonate (VEC), fluoroethylene carbonate (FEC), ethylene sulfite (ES), and propanesultone (PS).

The electrolytic solution may contain an additive for promoting an increase in internal pressure in the event of overcharging. Examples of the additive may include cyclohexylbenzene (CHB), biphenyl (BP), biphenyl ether (BPE), tert-butylbenzene (TBB), and tert-amyl benzene (TAB). The amount of the additive is about 0.1 to 5 mass %, for example.

EXAMPLES

The present embodiment will be described hereinafter with reference to examples, which are not intended to limit the present embodiment. While an example where the present embodiment is applied to a negative electrode sheet will be described hereinafter by way of example, the present embodiment is also applicable to a positive electrode sheet.

[Manufacture of Electrode Sheets]

Electrode sheets (negative electrode sheets) according to Nos. 1 to 11 were manufactured as follows. Here, the electrode sheets according to Nos. 1 to 8 correspond to examples, and the electrode sheets according to Nos. 9 to 11 correspond to comparative examples.

The following materials were prepared.
Electrode active material: graphite
Binder: SBR
Aqueous solvent: water.
Seven cellulose derivatives differing in types of substituents and moles of substitution, as shown below, were prepared.
HEC (moles of substitution: 4.0)
HPC (moles of substitution: 3.0)
HPC (moles of substitution: 4.0)
HPC (moles of substitution: 5.0)
HEMC (moles of substitution: 4.0)
HPMC (moles of substitution: 4.0)
CMC (moles of substitution: 1.5).

[No. 1]

1. Granulation Step (S10)

For an electrode sheet according to No. 1, HEC (moles of substitution: 4.0) was used as the cellulose derivative. The electrode active material (98 mass parts), the cellulose derivative (1 mass part), the binder (1 mass part), and the aqueous solvent were introduced into the agitation vessel of a granulator, and mixed to form a granulated material. The amount of the aqueous solvent used was adjusted such that the solids concentration in the granulated material was 70 mass %.

2. Placement Step (S20)

The electrode manufacturing apparatus shown in FIG. 4 was prepared. Granulated material 8 was molded into a sheet as described above, using electrode manufacturing apparatus 90.

Cu foil was prepared as the electrode current collector foil. Electrode current collector foil 11 was fed into electrode manufacturing apparatus 90 shown in FIG. 4 to place the sheet-like granulated material 8a on both surfaces of electrode current collector foil 11. The granulated material was dried in a drying oven, and then compressed with a rolling mill. The resulting material was then cut into a predetermined size, to thereby manufacture an electrode sheet shown in FIG. 5. The granulated material in FIG. 5 forms electrode mixture layer 12 (negative electrode mixture layer).

[Nos. 2 to 6 and 9]

Electrode sheets according to Nos. 2 to 6 and 9 were manufactured in the same manner as that for the electrode sheet according to No. 1, except that the cellulose derivative was changed from HEC (moles of substitution: 4.0) to HPC (moles of substitution: 4.0) and the like, as shown in Table 1.

TABLE 1

| | Method for Manufacturing Electrode Sheet | | | | Battery Performance |
| --- | --- | --- | --- | --- | --- |
| | | Cellulose Derivative | | Electrode | Capacity Retention |
| No. | Method for Forming Electrode | Type | Moles of Substitution | Amount Contained in Solids Mass % | Sheet Peel Strength N/m | after Low-Temperature Cycling % |
| 1 | Granulated Material Molding Method | HEC | 4.0 | 1.0 | 10.4 | 98 |
| 2 | Granulated Material Molding Method | HPC | 4.0 | 1.0 | 11.5 | 97 |

TABLE 1-continued

| | Method for Manufacturing Electrode Sheet | | | | Battery Performance |
| | | Cellulose Derivative | | Electrode | Capacity Retention |
| No. | Method for Forming Electrode | Type | Moles of Substitution | Amount Contained in Solids Mass % | Sheet Peel Strength N/m | after Low-Temperature Cycling % |
|---|---|---|---|---|---|---|
| 3 | Granulated Material Molding Method | HEMC | 4.0 | 1.0 | 11.7 | 98 |
| 4 | Granulated Material Molding Method | HPMC | 4.0 | 1.0 | 12.0 | 97 |
| 5 | Granulated Material Molding Method | HPC | 3.0 | 1.0 | 10.7 | 97 |
| 6 | Granulated Material Molding Method | HPC | 5.0 | 1.0 | 12.1 | 96 |
| 7 | Granulated Material Molding Method | HPC | 4.0 | 0.1 | 9.8 | 99 |
| 8 | Granulated Material Molding Method | HPC | 4.0 | 3.0 | 15.8 | 94 |
| 9 | Granulated Material Molding Method | CMC | 1.5 | 1.0 | 10.6 | 82 |
| 10 | Coating Method | CMC | 1.5 | 1.0 | 1.5 | 89 |
| 11 | Coating Method | HPC | 4.0 | 1.0 | 1.6 | 91 |

[Nos. 7 and 8]

Electrode sheets according to Nos. 7 and 8 were manufactured in the same manner as that for the electrode sheet according to No. 2, except that the amount of the cellulose derivative contained in the solids of the granulated material was changed, as shown in Table 1.

[No. 10]

An electrode sheet according to No. 10 was manufactured using the coating method. The electrode active material (98 mass parts), the cellulose derivative (1 mass part), the binder (1 mass part), and the aqueous solvent were introduced into the agitation vessel of a planetary mixer, and mixed to form a coating. The amount of the aqueous solvent used was adjusted such that the solids concentration in the coating was 50 mass %. The coating was applied to both surfaces of the electrode current collector foil using a die coater, and then dried. An electrode mixture layer was thus formed. Electrode sheet according to No. 10 was otherwise manufactured in the same manner as that for the electrode sheet according to No. 9.

[No. 11]

An electrode sheet according to No. 11 was manufactured in the same manner as that for the electrode sheet according to No. 10, except that the cellulose derivative was changed from CMC (moles of substitution: 1.5) to HPC (moles of substitution: 4.0), as shown in Table 1.

[Evaluation of Peel Strength]

A portion with a predetermined area was cut out from each of the electrode sheets for use as a sample, and the peel strength of the electrode mixture layer was measured using the 90° peel test in accordance with "JIS Z 0237: Testing methods of adhesive tapes and sheets". The results are shown in Table 1.

[Manufacture of Nonaqueous Electrolyte Secondary Batteries]

Evaluation batteries with a rated capacity of 4 Ah were manufactured using the electrode sheets (negative electrode sheets) manufactured as above.

1. Electrode Sheet Manufacturing Step (S100)

The following materials were prepared.

Electrode active material: $LiNi_{1/3}Co_{1/3}Mn_{1/3}O_2$
Conductive material: acetylene black
Binder: polyvinylidene difluoride
Solvent: N-methyl-2-pyrrolidone.

The electrode active material (90 mass parts), the conductive material (8 mass parts), the binder (2 mass parts), and the solvent were introduced into the agitation vessel of a granulator, and mixed to form a granulated material. The amount of the solvent used was adjusted such that the solids concentration in the granulated material was 75 mass %.

The granulated material was molded into a sheet as described above, using electrode manufacturing apparatus 90 shown in FIG. 4. Al foil was prepared as the electrode current collector foil. The electrode current collector foil was fed into the electrode manufacturing apparatus to place the granulated material on both surfaces of the electrode current collector foil. The granulated material was dried in a drying oven, and then compressed with a rolling mill. The resulting material was then cut into a predetermined size, to thereby manufacture an electrode sheet (positive electrode sheet) shown in FIG. 6. The granulated material in FIG. 6 forms electrode mixture layer 22 (positive electrode mixture layer).

2. Electrode Group Manufacturing Step (S200)

A separator with a three layer structure of PP/PE/PP was prepared.

As shown in FIG. 8, a wound-type electrode group was formed by stacking layers of a negative electrode sheet 10 and a positive electrode sheet 20 with a separator 30 therebetween, and then winding these stacked layers. The electrode group was then molded to have a flat shape, using a flat press machine.

3. Encasing Step (S300)

As shown in FIG. 9, electrode group 80 was encased in battery case 50.

4. Filling Step (S400)

Electrolytic solution 81 with the composition shown below was allowed to fill through a filling hole in battery case 50. The filling hole was then sealed off to seal battery case 50. As a result, nonaqueous electrolyte secondary batteries 100 according to Nos. 1 to 11 were manufactured.

[Electrolytic Solution Composition]

Supporting electrolyte: $LiPF_6$ (1.0 mol/L)

Solvent composition: [EC:DMC:EMC=3:4:3 (volume ratio)]

[Evaluation of Battery Performance: Low-Temperature Cycling Test]

In an environment at 25° C., each of the batteries was charged to 4.1 V at a current of 4 A, and subsequently discharged to 3.0 V at a current of 4 A, and the discharge capacity was measured. This discharge capacity was determined as the initial capacity.

The voltage of the battery was adjusted to 3.7 V. The battery was placed in a constant-temperature chamber set at −10° C., and allowed to stand for an hour. Then, in the same chamber, a pulse charge/discharge cycle in which one cycle consists of "charge→first rest→discharge→second rest" shown below was performed 100 times.

Charge: 80 A×20 seconds
First rest: 5 minutes
Discharge: 80 A×20 seconds
Second rest: 5 minutes.

After 100 cycles, the capacity after cycling was measured in the same manner as that for the initial capacity. The capacity retention (percentage) was determined by dividing the capacity after cycling by the initial capacity. The results are shown in Table 1. In Table 1, the higher the capacity retention after the low-temperature cycling is, the better the ion acceptability can be.

[Results and Consideration]

The electrode sheets according to Nos. 1 to 8 were manufactured using the granulated material molding method. The electrode sheets according to Nos. 1 to 8 had good peel strength. This is because the binder migration was prevented with a small amount of solvent. The electrode sheets according to Nos. 1 to 8 also had good ion acceptability. This is believed to be because the cellulose derivative was evenly dispersed in the granulated material, i.e., the electrode mixture layer, owing to the high water-solubility of HEC or the like used as the cellulose derivative.

The electrode sheet according to No. 9, which was manufactured using the granulated material molding method, had good peel strength. The electrode sheet according to No. 9, however, was inferior in ion acceptability. This is believed to be because CMC used as the cellulose derivative had low dispersibility.

The electrode sheets according to Nos. 10 and 11, which were manufactured using the coating method, were inferior in peel strength. This is believed to be because the binder migration occurred during drying of the coating. Moreover, in the cases where the coating method was used, the ion acceptability was substantially equal between the electrode sheet according to No. 10 (CMC, moles of substitution: 1.5) and the electrode sheet according to No. 11 (HPC, moles of substitution: 4.0). This is believed to be because in the coating method, the amount of solvent is large, so that even CMC with low water-solubility is dissolved and dispersed in the solvent, and therefore, the influence of the dispersibility of the cellulose derivative does not become evident.

By virtue of their excellent ion acceptability, the above-described nonaqueous electrolyte secondary batteries including the electrode sheets according to the present embodiment are particularly suitable as power sources for power applications where high rate characteristics are important. Examples of such applications may include a power source for strong hybrid vehicles and a power source for electric vehicles.

While embodiments of the present invention have been described as above, it should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

What is claimed is:

1. A method for manufacturing an electrode sheet comprising the steps of:
   introducing an electrode active material, a cellulose derivative, a binder, and an aqueous solvent into a granulator;
   mixing the electrode active material, the cellulose derivative, the binder, and the aqueous solvent within the granulator to form a granulated material comprising a plurality of composite granule particles each containing the electrode active material, the cellulose derivative, and the binder;
   molding the granulated material into a sheet; and
   placing the sheet on an electrode current collector foil to form the electrode sheet,
   the cellulose derivative being at least one selected from the group consisting of hydroxyethyl cellulose, hydroxypropyl cellulose, hydroxyethyl methylcellulose, and hydroxypropyl methylcellulose, and
   the cellulose derivative having 3.0 or more moles of substitution, which is an average number of hydroxy groups substituted per glucose unit.

2. The method for manufacturing an electrode sheet according to claim 1, wherein
   solids of the granulated material contain not less than 0.1 mass % and not more than 3.0 mass % of the cellulose derivative.

3. The method for manufacturing an electrode sheet according to claim 1, wherein
   a solids concentration of the granulated material is 60 mass % to 80 mass %, and the solids concentration represents the mass ratio of components other than the aqueous solvent.

4. The method for manufacturing an electrode sheet according to claim 1, wherein
   the cellulose derivative has 4.0 or more moles of substitution.

5. The method for manufacturing an electrode sheet according to claim 1, wherein
   the cellulose derivative has from 3.0 to 6.0 moles of substitution.

6. The method for manufacturing an electrode sheet according to claim 1, wherein
   the cellulose derivative has from 3.0 to 5.0 moles of substitution.

7. The method for manufacturing an electrode sheet according to claim 1, wherein
   the cellulose derivative has from 4.0 to 6.0 moles of substitution.

8. The method for manufacturing an electrode sheet according to claim 1, wherein
   the cellulose derivative has from 4.0 to 5.0 moles of substitution.

* * * * *